Feb. 21, 1961 D. D. SLITER 2,972,738

TRANSDUCER POSITIONING BY AIR LOADING

Filed July 14, 1958 2 Sheets-Sheet 1

*INVENTOR.*
DONALD D. SLITER

*BY* Walter J. Madden Jr.

ATTORNEY

Feb. 21, 1961 D. D. SLITER 2,972,738

TRANSDUCER POSITIONING BY AIR LOADING

Filed July 14, 1958 2 Sheets-Sheet 2

United States Patent Office 2,972,738 Patented Feb. 21, 1961

2,972,738

TRANSDUCER POSITIONING BY AIR LOADING

Donald D. Sliter, San Jose, Calif., assignor to International Business Machines Corporation, New York, N.Y., a corporation of New York Filed July 14, 1958, Ser. No. 748,457

7 Claims. (Cl. 340—174.1)

The present invention relates in general to transducer positioning and relates more particularly to positioning a transducer by means of an air flow around the transducer.

In the art of recording and reproducing data by means of one or more transducer heads mounted in operative proximity to a moving magnetic record surface, a problem arises in securing accurate, uniform and minimum spacing between the transducer and the magnetic recording surface. In most of such devices the record surface moves relative to the transducer, and it is desired to space the transducer as close to the record surface as possible, without producing actual contact between the two. This close spacing is particularly important in computer devices where the recorded data consists of magnetic data bits, since the minimum spacing obtainable between the transducer and record surface limits the maximum bit density which can be attained and hence limits the storage capacity of the device.

It is known that a rotating magnetic record disc, of the type commonly used in the random access files of electronic computing mechanisms, acts somewhat like a centrifugal fan rotor in that, by frictional drag with the ambient air, it generates a laminar flow of air along its flat side, such air moving in the resultant direction of disc rotation and radially outwardly from the disc axis. In the past, numerous attempts have been made to use this air flow to provide air support for a transducer head associated with the record disc. In my copending application Serial No. 745,193, filed June 27, 1958, assigned to the same assignee as the present application, there is disclosed a method of utilizing these air currents by means of a transducer-supporting member in the shape of an air foil. This air foil is disposed in the air current so as to have exerted thereon a force which both supports and positions the transducer adjacent the record surface. In the present invention, a transducer is mounted in a supporting arm having a vane portion which is disposed in the air current produced by movement of the record surface so as to have exerted thereon a force tending to position the supporting member and transducer adjacent the record surface.

In one embodiment of the present invention the supporting member has a vane portion which lies generally parallel to the direction of flow of the air current and which is pivoted for a limited movement in a direction generally perpendicular to the direction of the air flow. As the air current flows over the vane portion, the supporting arm tends to align itself in the air flow so as to position the transducer closely adjacent the record surface. In the absence of an air flow over the record surface, biasing means bias the supporting arm and transducer away from the record surface. In another embodiment of the present invention, the vane portion has a slightly upturned or otherwise raised lip portion facing the direction of air flow so that the air flow passing this lip exerts a thrust thereon which forces the vane and attached transducer into position adjacent the record surface.

It is therefore an object of the present invention to provide improved apparatus for positioning a transducer against a moving record surface.

It is a further object of the present invention to provide improved apparatus for positioning a transducer against a moving record surface utilizing the air flow produced by such movement of the record surface.

It is an additional object of this invention to provide apparatus for positioning a transducer against a moving record surface by mounting the transducer in a member which is movable in response to the air current produced by movement of the record surface to position the transducer adjacent the record surface.

It is a further object of the present invention to provide apparatus for positioning a transducer against a moving record surface by mounting the transducer in a member having a lip portion so disposed in the air current generated by movement of the record surface as to move the transducer into position adjacent the record surface.

Other objects of the invention will be pointed out in the following description and claims and illustrated in the accompanying drawings which disclose, by way of example, the principle of the invention and the best mode which has been contemplated of applying that principle.

Figure 1:
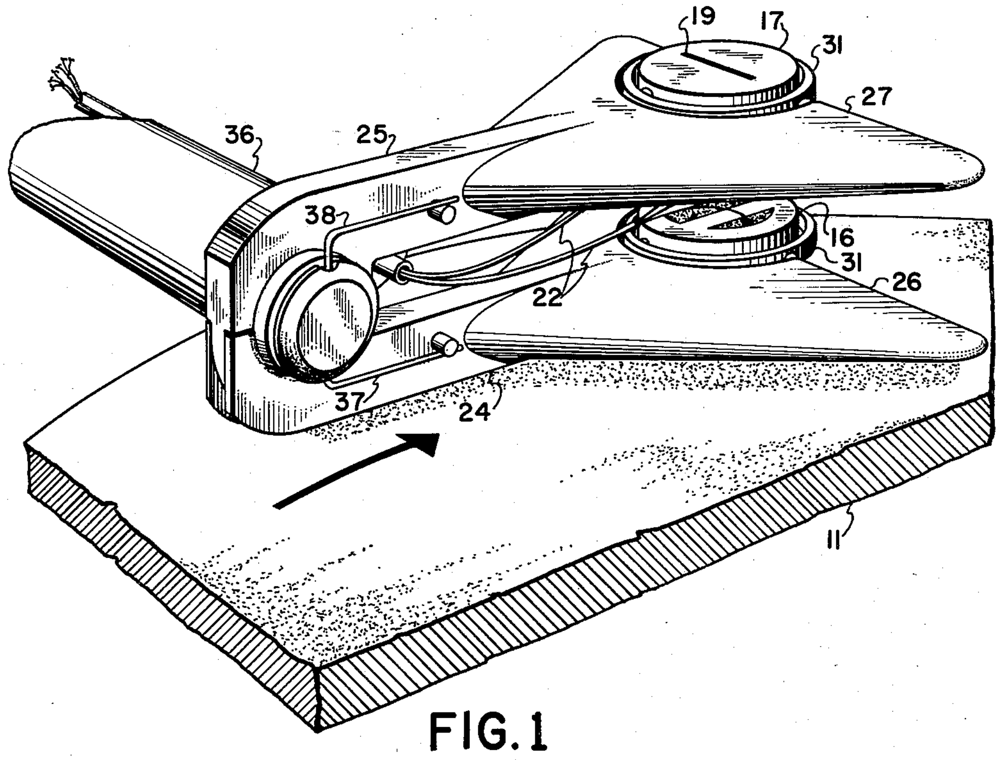
Fig. 1 is a perspective view of one embodiment of the present invention illustrating a pair of transducer positioning members which tend to align themselves in the air flow, in association with a moving record surface.
Figure 2:
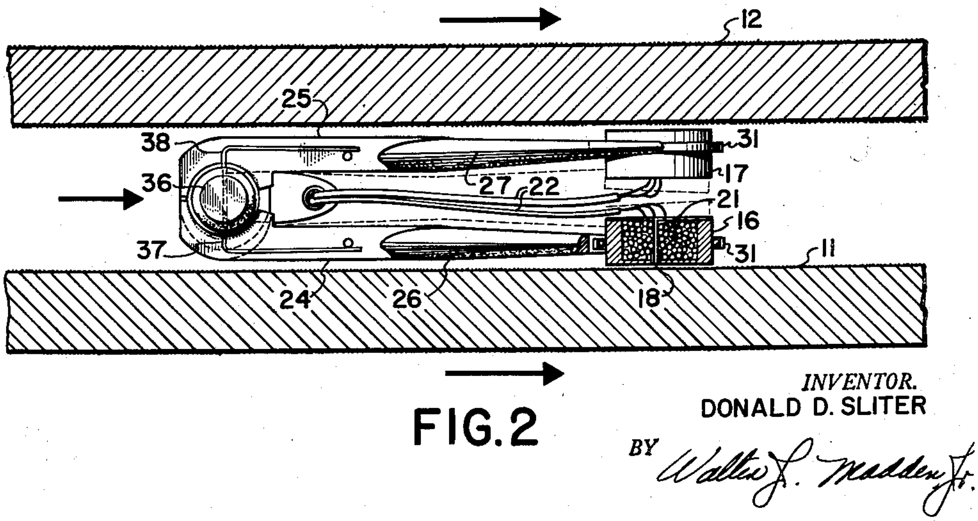
Fig. 2 is a side elevational view of the embodiment illustrated in Fig. 1, showing both record surfaces associated with the pair of transducers.

Referring to Figs. 1 and 2 by character of reference, numerals 11 and 12 designate two discs on which data is to be magnetically recorded and reproduced. Discs 11 and 12 may be of any suitable type, and generally will be of circular shape and be provided with coatings of a suitable magnetic material on each of the flat surfaces thereof. Discs 11 and 12, together with any other discs in the particular storage device, may be secured to a center spindle (not shown) and rotated by any suitable mechanism (not shown), such as an electric motor. To record and reproduce information from discs 11 and 12, there are provided a pair of transducers 16 and 17 which are adapted to cooperate magnetically with the magnetic record surfaces of discs 11 and 12. Transducers 16 and 17 may be of any suitable type and by way of example these transducers are illustrated having a center probe member 18 which extends through a slit 19 in the face of the transducer facing the record surface. Probe portions 18 may be surrounded by one or more coils 21 to which are supplied signals representing data to be recorded, and in which are generated signals corresponding to data reproduced from the record surface. Coils 21 are connected to suitable external circuits by means of conductors 22.

Transducers 16 and 17 are mounted on supporting arms generally designated as 24 and 25. Supporting arms 24 and 25 have vane portions 26 and 27 respectively which react with the air current produced by movement of record surfaces 11 and 12 to position the transducers adjacent the record surfaces. In the embodiment illustrated in Figs. 1 and 2, the vane portions 26 and 27 are in the shape of generally triangular or inverted wedge sections which extend generally parallel to the direction of air flow over the record surfaces. Transducers 16 and 17 are mounted in their respective vane portions 26 and 27 by any suitable means, such as gimbal rings 31 which are pivotally secured at two points to their associated vane portions 26 and 27. Transducers 16 and 17 are secured on the inner surface of gimbal rings 31 at two points 90° from the points at which rings 31 are secured to the associated vane portions. Thus, transducers 16 and 17 are gimbal mounted within the vane portions to permit movement of the transducers in aligning themselves with the moving record surfaces. Since the record surface over which the transducers ride is generally very smooth, only a very slight tilting movement is ever required between the transducers and the support members in order to permit the transducers to follow any small undulations which may exist in the record surface.

The ends of supporting arms 24 and 25 opposite to vane portions 26 and 27 are pivotally mounted on suitable means such as a shaft 36. Support members 24 and 25 are provided with generally semi-circular openings in the ends thereof which fit over shaft 36 to form a journal for providing pivotal movement of the supporting arms about shaft 36. Suitable means are provided for biasing supporting arms 24 and 25 and associated transducers 16 and 17 about supporting shaft 36 away from the record surfaces 11 and 12. Such bias means may be of any suitable type, such as springs 37 and 38 which engage pins on arms 24 and 25 to a biasing force against the associated support arms tending to pivot them about shaft 36 in a direction away from record surfaces 11 and 12.

In operation, when discs 11 and 12 are not rotating, there is no appreciable air current flowing between the discs and hence, no air thrust exerted against the vane portions. Under these conditions, biasing springs 37 and 38 bias arms 24 and 25 in a direction away from discs 11 and 12 to occupy the dotted line position shown in Fig. 2. As the velocity of rotation of the discs increases, the velocity of the air current between the discs increases correspondingly. In this connection, it will be understood that until the discs obtain a sufficient rotational velocity there is not sufficient laminar air flow to form an air bearing for the transducer on the record surface; therefore, the bias force exerted by springs 37 and 38 is made sufficiently strong to maintain transducers 16 and 17 away from the record surfaces until the discs obtain sufficient rotational velocity. This prevents transducers 16 and 17 from being positioned adjacent the record surfaces by air loading before an air bearing is formed, to prevent damage from contact between the transducers and the record surfaces.

With discs 11 and 12 rotating at the desired velocity, the frictional drag of the air generates a laminar flow of air along the flat sides of the record surfaces in the direction indicated by the arrows. This air flow exerts a lifting thrust against vane portions 26 and 27 so that vane portions 26 and 27 tend to align themselves substantially parallel to the air flow. Thus, vane portions 26 and 27, with associated transducers 16 and 17, are forced apart by the air flow against the action of bias spring 37 until the vane portions 26 and 27 are substantially parallel to the direction of air flow between discs 11 and 12. As clearly shown in Fig. 2, when the vane portions 26 and 27 are aligned with the air flow, the transducers 16 and 17 are positioned closely adjacent the associated record surfaces 11 and 12 so as to magnetically cooperate therewith with maximum efficiency.

It will be understood that transducers 16 and 17 do not actually contact the record surfaces 11 and 12, since the film of air between the transducers and the record surface forms a very small air bearing which prevents actual contact between the transducers and the record surface. Thus, the circuits associated with transducers 16 and 17 may be energized to record on or reproduce from record surfaces 11 and 12, with transducers 16 and 17 positioned closely adjacent the surface. When the motive power source for discs 11 and 12 is de-energized, the decrease in air flow resulting from the decreasing velocity of rotation of the discs enables bias springs 37 and 38 to pivot supporting arms 24 and 25 about shaft 36. This withdraws transducers 16 and 17 from the record surfaces, to prevent contact between the transducers and the record surfaces, upon shutdown or breakdown of the machinery.

Figure 3:
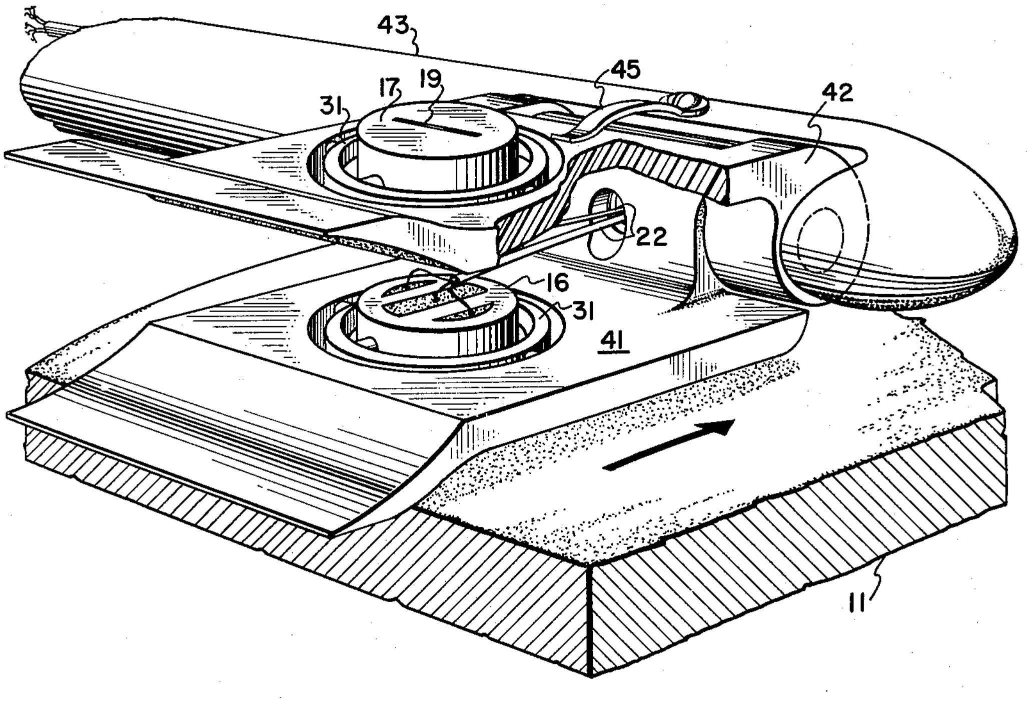
Fig. 3 is a perspective view illustrating an alternative embodiment of the invention in which the supporting members have upturned lip portions against which the air current flow exerts a force tending to position the transducers adjacent the record surface.
Figure 4:
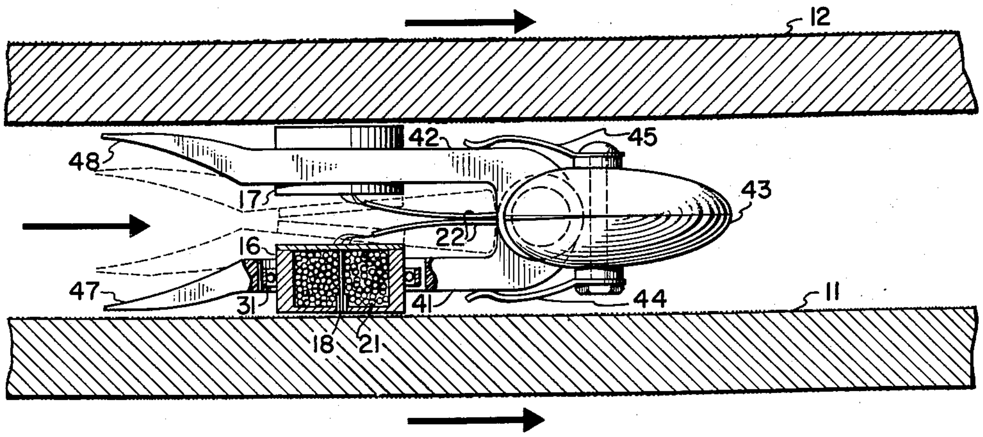
Fig. 4 is a side elevational view of the embodiment illustrated in Fig. 3.

Figs. 3 and 4 illustrate an alternative embodiment of the present invention in which the vane portion of the supporting arm for the transducer is provided with a slightly raised or upturned lip portion which is disposed in the air current produced by the record surface movement so as to have exerted thereon a thrust tending to position the vane member and associated transducer adjacent the record surface. As shown in these figures, transducers 16 and 17 are supported in a pair of supporting arms 41 and 42 between record surfaces 11 and 12 by means of gimbal ring 31 which is secured in an opening in the supporting arm, as in the embodiment illustrated in Figs. 1 and 2. Supporting arms 41 and 42 are pivotally mounted on a shaft 43 which is secured to suitable means (not shown). Supporting arms 41 and 42 are biased about shaft 43 by means of bias springs 44 and 45 which are secured to shaft 43 and which exert biasing forces against their associated supporting arms 41 and 42 to move the supporting arms and transducers away from the record surfaces.

The ends of supporting arms 41 and 42 opposite to supporting shaft 43 are provided with vane portions 47 and 48 which have lips or other raised portions thereon which are so disposed in the air flow between record surfaces 11 and 12 as to have exerted thereon a thrust tending to position transducers 16 and 17 adjacent record surfaces 11 and 12. As clearly shown in Fig. 4, vane portions 47 and 48 present upturned surfaces to the air flowing between the record surfaces to produce an air thrust against these vane portions tending to pivot arms 41 and 42 about shaft 43 to position transducers 16 and 17 adjacent record surfaces 11 and 12. In the absence of appreciable air flow between record surfaces 11 and 12, bias springs 44 and 45 bias arms 41 and 42 about shaft 43 to remove transducers 16 and 17 from their operating positions adjacent record surfaces 11 and 12.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for supporting a transducer relative to a movable record surface, comprising a supporting arm, means for mounting said transducer on said supporting arm adjacent said record surface, and pivot means for said supporting arm, said supporting arm having a vane portion disposed in the air current created by the air drag of said moving record surface for moving said supporting arm about said pivot toward said record surface in response to said air current to position said transducer closely adjacent said record surface.

2. Apparatus for supporting a transducer relative to a movable record surface, comprising a supporting arm, means for mounting said transducer on said supporting arm adjacent said record surface, pivot means for said supporting arm, and means for biasing said supporting arm about said pivot means to bias said supporting arm and said transducer away from said record surface, said supporting arm having a vane portion disposed in the air current created by the air drag of said moving record surface for moving said supporting arm about said pivot toward said record surface in response to said air current to position said transducer closely adjacent said record surface.

3. Apparatus for supporting a transducer relative to a movable record surface, comprising a supporting arm, means for mounting said transducer on said supporting arm in a plane generally parallel to said record surface, pivot means for said supporting arm, and means for biasing said supporting arm about said pivot means to bias said supporting arm and said transducer away from said record surface, said supporting arm having a vane portion with an upturned lip disposed in the air current created by the air drag of said moving record surface for moving said supporting arm about said pivot toward said record surface in response to said air current to position said transducer closely adjacent said record surface.

4. Apparatus for supporting a transducer relative to a movable record surface, comprising a supporting arm, means for mounting said transducer on said supporting arm in a plane generally parallel to said record surface, pivot means for said supporting arm, and means for biasing said supporting arm about said pivot means to bias said supporting arm and said transducer away from said record surface, said supporting arm having a vane portion disposed in the air current created by the air drag of said moving record surface for moving said supporting arm about said pivot toward said record surface in response to said air current to position said transducer closely adjacent said record surface.

5. Apparatus for supporting a pair of transducers relative to a pair of parallel movable record surfaces, comprising a pair of supporting arms, means for mounting said transducers on said supporting arms between said record surfaces, and pivot means for said supporting arms, said supporting arms having vane portions disposed in the air current created by the air drag of said moving record surfaces for moving said supporting arms about said pivot toward said record surfaces in response to said air current to position said transducers closely adjacent said record surfaces.

6. Apparatus for supporting a pair of transducers relative to a pair of parallel movable record surfaces comprising a pair of supporting arms, means for mounting said transducers on said supporting arms between said record surfaces in a plane generally parallel to said record surfaces, pivot means for said supporting arms, and means for biasing said supporting arms about said pivot means to bias said supporting arms and said transducers away from said record surfaces, said supporting arms having vane portions disposed in the air current created by the air drag of said moving record surfaces for moving said supporting arms about said pivot toward said record surfaces in response to said air current to position said transducers closely adjacent said record surfaces.

7. Apparatus for supporting a transducer relative to a movable record surface, comprising a supporting arm, means for mounting said transducer on said supporting arm adjacent to and in a plane generally parallel to said record surface, pivot means for said supporting arm, said supporting arm having a vane portion substantially parallel to the air current created by the air drag of said moving record surface for moving said supporting arm about said pivot toward said record surface in response to said air current to position said transducer closely adjacent said record surface, and means for biasing said supporting arm about said pivot means to bias said supporting arm and said transducer away from said record surface in the absence of said air current.

References Cited in the file of this patent

UNITED STATES PATENTS

| | | |
|---|---|---|
| 2,800,642 | May | July 23, 1957 |
| 2,862,781 | Baumeister | Dec. 2, 1958 |